United States Patent
Chang et al.

(10) Patent No.: US 8,775,613 B2
(45) Date of Patent: Jul. 8, 2014

(54) METHOD AND SYSTEM FOR PROVIDING NETWORK MONITORING, SECURITY EVENT COLLECTION APPARATUS AND SERVICE ABNORMALITY DETECTION APPARATUS FOR NETWORK MONITORING

(75) Inventors: Beom Hwan Chang, Daejeon (KR); Chi Yoon Jeong, Daejeon (KR); Seon-Gyoung Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 328 days.

(21) Appl. No.: 13/272,687

(22) Filed: Oct. 13, 2011

(65) Prior Publication Data

US 2012/0096150 A1 Apr. 19, 2012

(30) Foreign Application Priority Data

Oct. 14, 2010 (KR) .......................... 10-2010-0100148
Apr. 4, 2011 (KR) .......................... 10-2011-0030873

(51) Int. Cl.
*G06F 15/173* (2006.01)

(52) U.S. Cl.
USPC ...................................... 709/224

(58) Field of Classification Search
USPC ............... 709/224, 223, 225, 203–207; 370/230–239, 252–258; 726/22–27
See application file for complete search history.

(56) References Cited

U.S. PATENT DOCUMENTS 7,266,754 B2 * 9/2007 Shah et al. .................... 714/776
7,716,329 B2 * 5/2010 Lee et al. ...................... 709/224
7,930,740 B2 * 4/2011 Davis et al. .................... 726/22
2010/0220619 A1 9/2010 Chikira et al.

FOREIGN PATENT DOCUMENTS

KR 1020080001303 A 1/2008
KR 1020090054196 A 5/2009

OTHER PUBLICATIONS

Kim et al., "Image-Based Anomaly Detection Technique: Algorithm, Implementation and Effectiveness," Oct. 2006, IEEE Journal on Selected Areas in Communications, vol. 24, No. 10.*
Jeong et al., "A hierarchical approach to traffic anomaly detection using image processing technique," Aug. 2010, IEEE 2010 Sixth International Conference on Networked Computing and Advanced Information Management (NCM), ieeexplore.ieee.org/xpl/articleDetails.jsp?arnumber=5573233.*
Seong Soo Kim, et al; "Image-Based Anomaly Detection Technique: Algorithm, Implementation and Effectiveness", IEEE Journal on Selected Areas in Communications, vol. 24, No. 10, Oct. 2006, pp. 1942-1954.

* cited by examiner

*Primary Examiner* — Ruolei Zong
(74) *Attorney, Agent, or Firm* — Ladas & Parry LLP

(57) ABSTRACT

A network monitoring system includes: a traffic information generating apparatus for generating traffic information. Further, the network monitoring system includes a security event collecting apparatus for collecting the traffic information generated by the traffic information generating apparatus by referring to pre-stored traffic information, grouping the collected traffic information, and then extracting service information. Furthermore, the network monitoring system includes a service abnormal condition detecting apparatus for detecting a port number of a transport layer of service information extracted from the security event collecting apparatus and the occurrence frequency of the transport layer, determining the continuity of the port number and the uniformity of the occurrence frequency, and displaying a service abnormal condition.

15 Claims, 3 Drawing Sheets

FIG.3
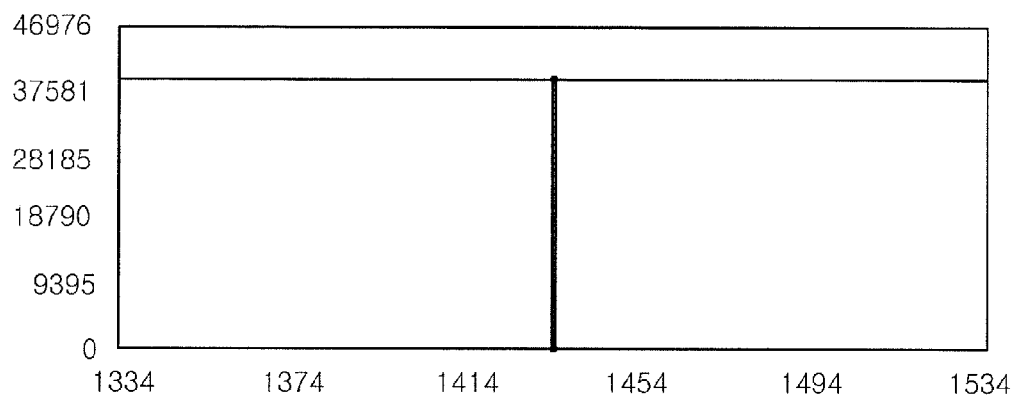
FIG.4
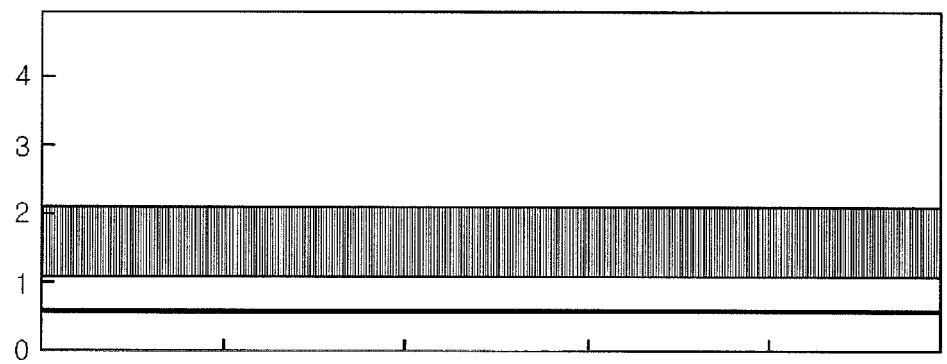
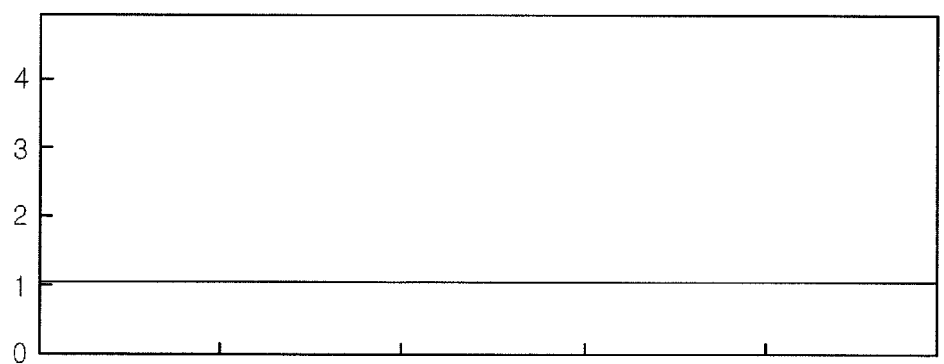

METHOD AND SYSTEM FOR PROVIDING NETWORK MONITORING, SECURITY EVENT COLLECTION APPARATUS AND SERVICE ABNORMALITY DETECTION APPARATUS FOR NETWORK MONITORING

CROSS-REFERENCE TO RELATED APPLICATION(S)

The present invention claims priority of Korean Patent Application No. 10-2010-0100148, filed on Oct. 14, 2010, and Korean Patent Application No. 10-2011-0030873, filed on Apr. 4, 2011, which are incorporated herein by references.

FIELD OF THE INVENTION

The present invention relates to detecting the reliability of a network service using the continuity of a TCP/IP transport layer protocol port number and the uniformity of occurrence frequency; and more particularly, to a network monitoring technology which is suitable to classify the form of an existing server and the form of a network attack by visually displaying and detecting unnatural or artificial formation of a service state consisting of traffic flows of a network.

BACKGROUND OF THE INVENTION

In most of the prior art network abnormal condition detection technologies using traffic, a network (or system) address, a protocol, a port number, and the number of packets, and the like are used to analyze the state of the corresponding item. As another method, data is represented in a coordinate plane or a geometrical figure depending on a certain rule to display abnormal conditions. For example, in a two-dimensional (2D) coordinate system, an X-axis is set as an address (or port) of a source, and an Y-axis is set as an address (or port) of a destination to display the correlation between the source and destination of traffic or represent the occurrence frequency, thereby predicting and detecting an abnormal condition.

In this method, a displayed network state image or graph is used to represent only whether abnormal traffic occurs (that is, multiple normal servers and network attacks are included). Since it is difficult to accurately classify and represent a normal server providing a network service and traffic causing an attack, it is difficult to provide countermeasures for abnormal conditions. As a result, it takes a lot of time for the administrator to find harmful traffic causing the abnormal conditions and to provide countermeasures for the abnormal conditions, causing great damage.

In addition, when multiple attacks, rather than a single attack, are simultaneously made, or a new attack other than the existing attacks occurs, it becomes much more difficult to detect and display the attacks.

SUMMARY OF THE INVENTION

In view of the above, the present invention provides an apparatus and method for accurately detecting and intuitively recognizing whether a current service is communication with normal servers or a network attack by analyzing and displaying the continuity of transport layer port numbers and the uniformity of occurrence frequency, which are important attributes of traffic flows constituting a network service to quickly find out whether the corresponding service consists of artificially generated traffics or is configured in a normal form.

In accordance a first aspect of the present invention, there is provided a network monitoring system, the system including: a traffic information generating apparatus for generating traffic information; a security event collecting apparatus for collecting the traffic information generated by the traffic information generating apparatus by referring to pre-stored traffic information, grouping the collected traffic information, and then extracting service information; and a service abnormal condition detecting apparatus for detecting a port number of a transport layer of service information extracted from the security event collecting apparatus and the occurrence frequency of the transport layer, determining the continuity of the port number and the uniformity of the occurrence frequency, and displaying a service abnormal condition.

In accordance a second aspect of the present invention, there is provided a security event collecting apparatus, the apparatus including: a traffic information collecting unit for collecting traffic information generated by a traffic information generating apparatus; a traffic information referencing unit for referring to a traffic information database for pre-stored traffic information; and a traffic information grouping unit for grouping the traffic information collected by the traffic information collecting unit and referred to by the traffic information referencing unit, and then extracting service information.

In accordance a third aspect of the present invention, there is provided a service abnormal condition detecting apparatus, the apparatus including: a port number detecting unit for detecting a port number of a transport layer of service information extracted from a security event collecting apparatus; an occurrence frequency detecting unit for detecting the occurrence frequency of the transport layer; and an abnormal condition determining and display unit for determining the continuity of the port number and the uniformity of the occurrence frequency based on the results detected by the port number detecting unit and the occurrence frequency detecting unit, and displaying the determination results to the outside.

In accordance a fourth aspect of the present invention, there is provided a network monitoring method, the method including: collecting traffic information generated by a traffic information generating apparatus or referring to a traffic information database for traffic information, to group the traffic information by network service information; detecting a port number of a transport layer of the traffic information grouped by the network service information and the occurrence frequency of the transport layer; and displaying the determination results of the continuity of the port number and the uniformity of the occurrence frequency to the outside.

As a result, the present invention has the advantage the user's intervention is not required because the reliability of a network service is detected using the characteristics of a transport layer port number. Moreover, in the event of an abnormal condition, the form of an existing server and the form of a network attack can be accurately classified and automatically reported to the user, thus enabling the user to rapidly recognize and take countermeasures for abnormal conditions.

BRIEF DESCRIPTION OF THE DRAWINGS

The objects and features of the present invention will become apparent from the following description of embodiments, given in conjunction with the accompanying drawings, in which:

FIG. 3 is a graph showing the continuity of a port number and the uniformity of occurrence frequency analyzed and displayed by the service abnormal condition detecting apparatus 200 of FIG. 1 in accordance with an embodiment of the present invention, for example, a graph illustrating a slammer worm attack; and FIG. 4 is a graph showing the continuity of a port number and the uniformity of occurrence frequency analyzed and displayed by the service abnormal condition detecting apparatus 200 of FIG. 1 in accordance with an embodiment of the present invention, for example, a graph illustrating a denial of service (DoS) attack.

DETAILED DESCRIPTION OF THE EMBODIMENTS

The present invention is for detecting a network abnormal condition using the continuity of a transport layer protocol port number and the uniformity of occurrence frequency. To this end, the present invention can use various traffic information including five basic attributes of traffic, such as a protocol, a source address, a source port, a destination port, and a destination address.

In an embodiment of the present invention to be described hereinbelow, a method using flows or netflows as traffic information will be described. However, this description is only an example, and it should be noted that the method applied in the present invention can be extended to a technology using various traffic information.

To this end, a network monitoring technology using the continuity of a TCP/IP transport layer protocol port number and the uniformity of occurrence frequency 1 in accordance with the present invention requires a traffic attribute collection unit and extraction unit for collecting traffic flows generated by an external traffic flow generator or grouping the traffic flows by a network service with reference to the traffic flow information of the external traffic information storage unit. Also, it may require a service abnormality display unit and a determination unit that determine the presence or absence of a network attack by displaying and analyzing the continuity of transport layer port numbers and the uniformity of occurrence frequency, which are important attributes of the traffic flows grouped by the network service.

Hereinafter, an embodiment of the present invention will be described in detail with reference to the accompanying drawings which form a part hereof.

Figure 1:
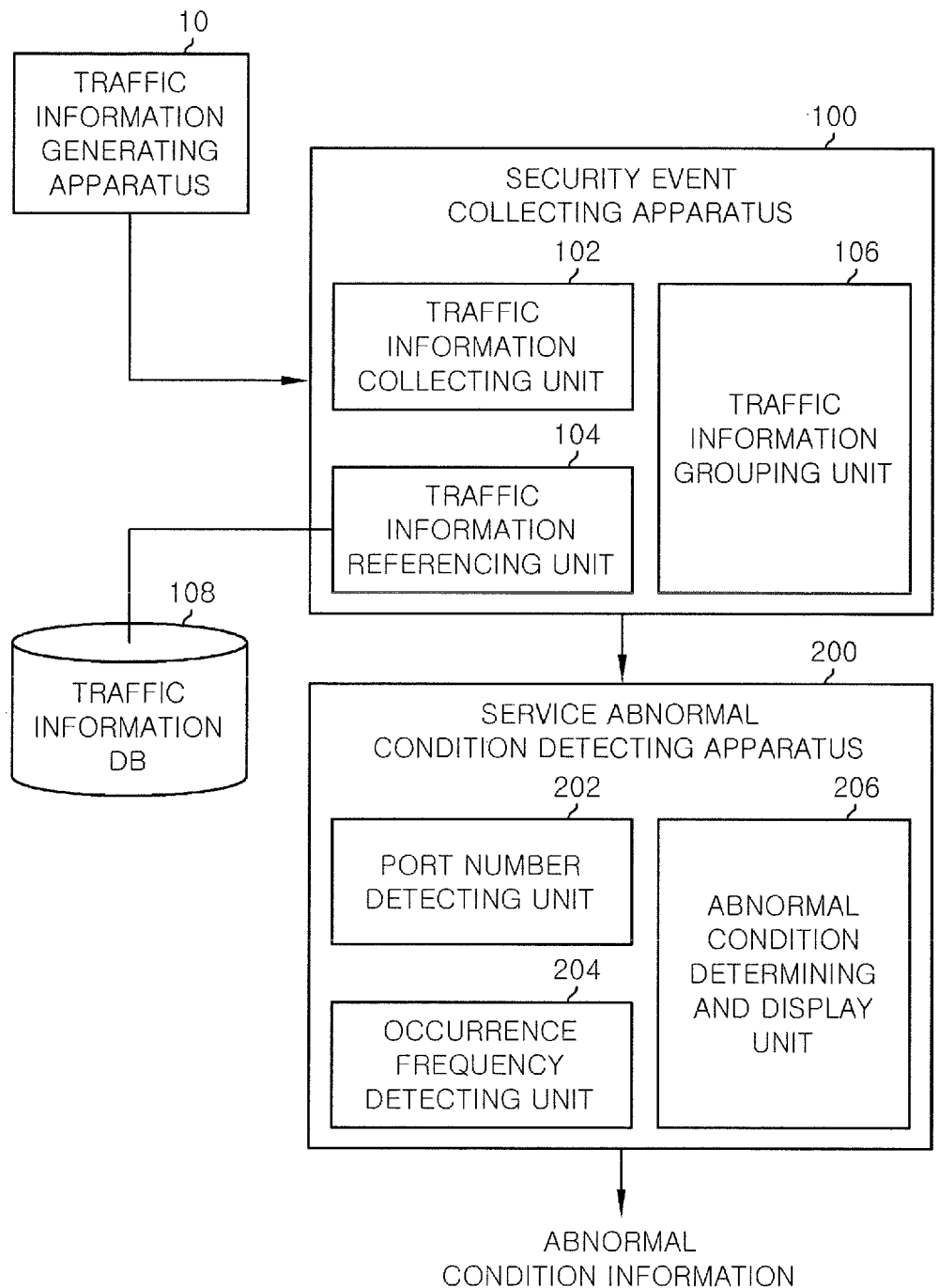
FIG. 1 is a block diagram showing a network monitoring system in accordance with an embodiment of the present invention.

FIG. 1 is a block diagram showing a network monitoring system using the continuity of a port number and the uniformity of occurrence frequency in accordance with an embodiment of the present invention. This network monitoring system may include a traffic information generating apparatus 10, a security event collecting apparatus 100, a service abnormal condition detecting unit 200, and the like.

As shown in FIG. 1, the traffic information generating apparatus 10 generates external traffic information, for example, traffic information using flows or netflows.

The security event collecting apparatus 100 serves to collect traffic flows (or netflows) generated by the traffic information generating apparatus 10 to extract traffic information, and to group the extracted traffic information and then extract service information.

Specifically, the security event collecting apparatus 100 may include a traffic information collecting unit 102, a traffic information referencing unit 104, a traffic information grouping unit 106, and the like.

The traffic information collecting unit 102 serves to collect traffic information, e.g., traffic flows (or netflows), generated by the traffic information generating apparatus 10.

The traffic information referencing unit 104 serves to refer to an externally connected traffic information DB 108 for pre-stored traffic information, and provides referred results to the traffic information grouping unit 106.

The traffic information grouping unit 106 serves to group the traffic information collected by the traffic information collecting unit 102 and referred to by the traffic information referencing unit 104, and then extracts the service information.

The grouping includes a process of grouping the traffic information so that attribute information includes at least one of port information, such as a protocol, a source address, a source port, a destination port, and a destination address, by using a protocol, which is one of the traffic attributes.

Through this grouping, the following seven types of service information can be extracted:
1. Source address, source port
2. Source address, destination port
3. Source address, destination address
4. Source port, destination address
5. Destination port, destination address
6. Source address, destination port, destination address
7. Source address, source port, destination address In this manner, the service information finally extracted by the security event collecting apparatus 100 can be provided to the service abnormal condition detecting apparatus 200.

The service abnormal condition detecting apparatus 200 serves to detect attribute information of the service information extracted from the security event collecting apparatus 100, for example, a transport layer port number and the occurrence frequency of a transport layer, determine the continuity of the port number and the uniformity of the occurrence frequency, and display a service abnormal condition (e.g., a network attack, or the like).

Specifically, the service abnormal condition detecting apparatus 200 includes a port number detecting unit 202, an occurrence frequency detecting part 204, an abnormal condition determining and display unit 206, and the like.

The port number detecting unit 202 serves to detect the port number of the transport layer of the service information extracted from the security event collecting apparatus 100.

The occurrence frequency detecting unit 204 serves to detect the occurrence frequency of the transport layer of the service information extracted from the security event collecting apparatus 100.

The abnormal condition determining and display unit 206 serves to determine the continuity of the port number and the uniformity of the occurrence frequency based on the results detected by the port number detecting unit 202 and the occurrence frequency detecting unit 204, and display the determination results to the outside.

Figure 2:
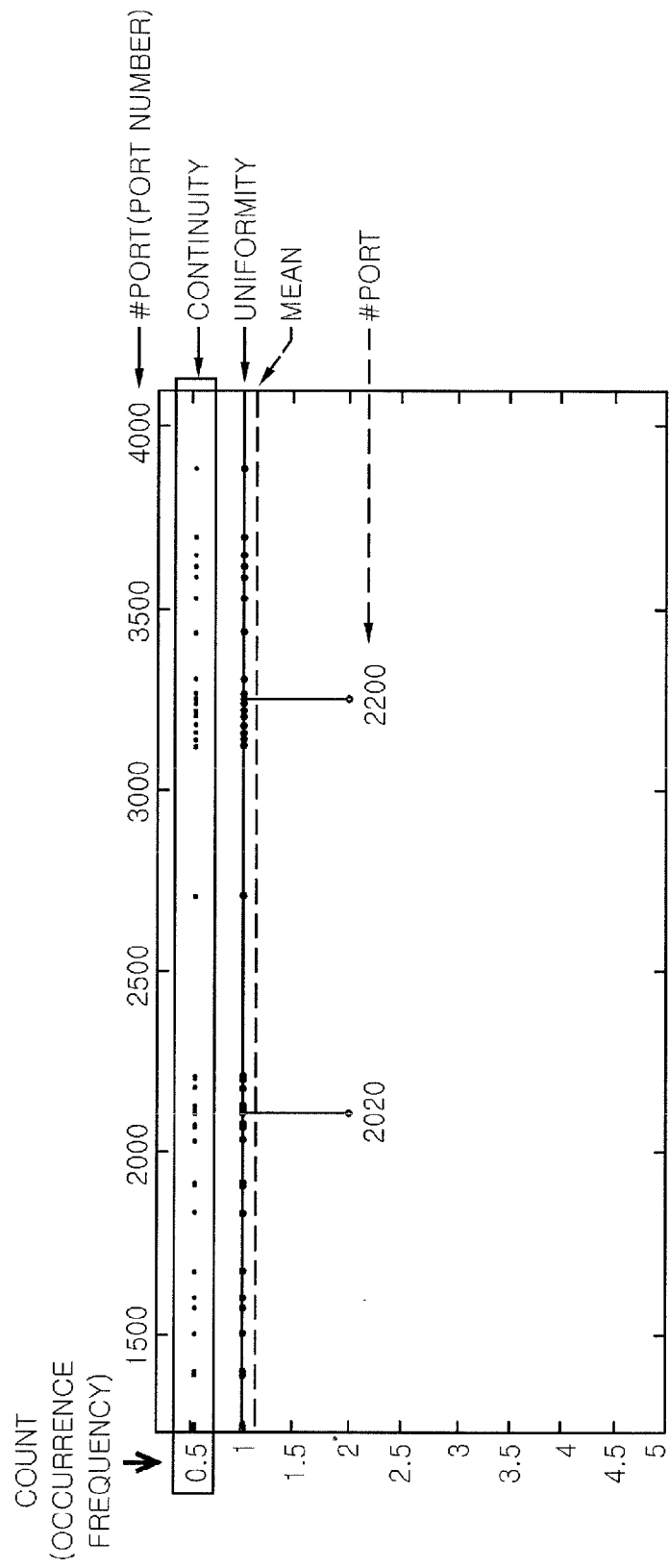
FIG. 2 is a graph illustrating the continuity of a port number and the uniformity of occurrence frequency displayed and analyzed by the service abnormal condition detecting apparatus 200 of FIG. 1 in accordance with an embodiment of the present invention.

The determination results of the continuity of the port number and the uniformity of the occurrence frequency displayed by the abnormal condition determining and display unit 206 are illustrated as in the graph of FIG. 2.

In the 2D coordinate system of FIG. 2, an X-axis is defined as port number, and a Y-axis is defined as occurrence frequency (number of sessions), and the source port and the destination port can be displayed as dot coordinates.

In order to determine the continuity of a port number and the uniformity of occurrence frequency, the service abnormal condition detecting apparatus 200 in accordance with the embodiment of the present invention determines the continuity of a port number and uniform distribution of the occurrence frequency by using, for example, a Hough Transform-based line detection technique widely used in the area of image processing. However, complete line connection may not be obtained due to an external cause. Thus, another technique of the area of image processing, for example, a connected component labeling (CCL) may be used. By this, if a connected region is larger than a predetermined size, this may be defined as artificially generated ports.

In general, artificially generated attacks, for example, port scan attacks, internet worms, DoS attacks, distributed denial of service (DDoS) attacks, and the like are characterized in that port numbers are continuously generated or occurrence frequency is uniformly distributed. However, even in the case of scanning for increasing port numbers one by one, if an external traffic flow generating apparatus performs sampling, the port numbers may be represented on an image in a broken form without being completely connected together. Accordingly, in case no connected region exists, whether to use port scanning or not can be determined using the degree of concentration on the mean.

FIG. 3 is a graph showing the continuity of a port number and the uniformity of occurrence frequency analyzed and displayed by the service abnormal condition detecting apparatus 200 of FIG. 1 in accordance with an embodiment of the present invention, for example, a graph illustrating a slammer worm attack.

In case of the slammer worm attack of FIG. 3, when services grouped by source address and destination port are displayed and analyzed, it can be seen that abnormal services are provided because of too high occurrence frequency of connection from a particular source port to a particular destination port.

FIG. 4 is a graph showing the continuity of a port number and the uniformity of occurrence frequency analyzed and displayed by the service abnormal condition detecting apparatus 200 of FIG. 1 in accordance with an embodiment of the present invention, for example, a graph illustrating a denial of service (DoS) attack.

In case of the DoS attack of FIG. 4, it can be seen that an abnormal service is provided in such a way that source ports are generated twice at a predetermined ratio in order to generate a large amount of traffic flows.

As described above, in accordance with the embodiment of the present invention, it is possible to readily find out the reliability of a network service using the continuity of a source and destination port number of traffic and the uniformity of occurrence frequency, particularly to detect it by easily classifying important servers providing services and various network attacks, e.g., scanning attacks, internet worms, and the like.

While the invention has been shown and described with respect to the embodiments, it will be understood by those skilled in the art that various changes and modifications may be made without departing from the scope of the invention as defined in the following claims.

What is claimed is:

1. A network monitoring system, the system comprising:
a traffic information generating apparatus stored in a memory and executed by a processor for generating traffic information;
a security event collecting apparatus stored in the memory and executed by the processor for collecting the traffic information generated by the traffic information generating apparatus by referring to pre-stored traffic information, grouping the collected traffic information, and then extracting service information; and
a service abnormal condition detecting apparatus stored in the memory and executed by the processor for detecting a port number of a transport layer of service information extracted from the security event collecting apparatus and the occurrence frequency of the transport layer, determining the continuity of the port number and the uniformity of the occurrence frequency, and displaying a service abnormal condition,
wherein, an abnormal condition detection and display unit stored in the memory and executed by the processor displays the source port and the destination port as dot coordinates in a two-dimensional coordinate system,
wherein the two-dimensional coordinate system comprises an X-axis defined as the port number, and a Y-axis defined as an occurrence frequency (number of sessions).

2. The network monitoring system of claim 1, wherein the traffic information includes traffic flows or traffic netflows.

3. A security event collecting apparatus, the apparatus comprising:
a traffic information collecting unit stored in a memory and executed by a processor for collecting traffic information generated by a traffic information generating apparatus;
a traffic information referencing unit stored in the memory and executed by the processor for referring to a traffic information database for pre-stored traffic information;
a traffic information grouping unit stored in the memory and executed by the processor for grouping the traffic information collected by the traffic information collecting unit and referred to by the traffic information referencing unit, and then extracting service information; and
an abnormal condition detection and display unit stored in the memory and executed by the processor that displays, based on the extracted service information, a source port and a destination port as dot coordinates in a two-dimensional coordinate system,
wherein the two-dimensional coordinate system comprises an X-axis defined as the port number, and a Y-axis defined as an occurrence frequency (number of sessions).

4. The security event collecting apparatus of claim 3, wherein the traffic information grouping unit groups the traffic information so that attribute information includes at least one port information.

5. The security event collecting apparatus of claim 4, wherein the attribute information includes at least one of the following: a protocol, a source address, a source port, a destination port, and a destination address.

6. The security event collecting apparatus of claim 3, wherein the traffic information includes traffic flows or traffic netflows.

7. A service abnormal condition detecting apparatus, the apparatus comprising:
a port number detecting unit stored in a memory and executed by a processor for detecting a port number of a transport layer of service information extracted from a security event collecting apparatus;
an occurrence frequency detecting unit stored in the memory and executed by the processor for detecting the occurrence frequency of the transport layer; and an abnormal condition determining and display unit stored in the memory and executed by the processor for determining the continuity of the port number and the uniformity of the occurrence frequency based on the results detected by the port number detecting unit and the occurrence frequency detecting unit, and displaying the determination results to the outside, wherein, in a two-dimensional coordinate system, an X-axis is defined as the port number, and a Y-axis is defined as the occurrence frequency (number of sessions), and the abnormal condition detection and display unit displays the source port and the destination port as dot coordinates.

8. The service abnormal condition detecting apparatus of claim 7, wherein the transport layer includes a transport layer based on an Internet protocol.

9. The service abnormal condition detecting apparatus of claim 7, wherein the abnormal condition determination and display unit determines the continuity of the port number and uniform distribution of the occurrence frequency by using a Hough Transform-based line detection technique.

10. The service abnormal condition detecting apparatus of claim 7, wherein the abnormal condition determination and display unit determines the continuity of the port number and uniform distribution of the occurrence frequency by using a connected component labeling (CCL).

11. The service abnormal condition detecting apparatus of claim 7, wherein the service information includes at least one of the following: a protocol, a source address, a source port, a destination port, and a destination address.

12. A network monitoring method, the method comprising:
collecting traffic information generated by a traffic information generating apparatus or referring to a traffic information database for traffic information, to group the traffic information by network service information;
detecting a port number of a transport layer of the traffic information grouped by the network service information and the occurrence frequency of the transport layer; and
displaying the determination results of the continuity of the port number and the uniformity of the occurrence frequency to the outside,
wherein, in a two-dimensional coordinate system, an X-axis is defined as the port number, and a Y-axis is defined as the occurrence frequency (number of sessions), and said displaying the determination results displays the source port and the destination port as dot coordinates.

13. The network monitoring method of claim 12, wherein the traffic information includes traffic flows or traffic netflows.

14. The network monitoring method of claim 12, wherein the network service information includes at least one of the following: a protocol, a source address, a source port, a destination port, and a destination address.

15. The network monitoring method of claim 12, wherein the transport layer includes a transport layer based on an internet protocol.

* * * * *